United States Patent [19]

Eckstein

[11] Patent Number: 4,704,788

[45] Date of Patent: Nov. 10, 1987

[54] METHOD FOR MAKING MAGNETIC HEADS

[75] Inventor: Karlheinz Eckstein, Fuerth, Fed. Rep. of Germany

[73] Assignee: Grundig E.M.V. Elektro-Mechanische Versuchsanstalt Max Grundig Helland, Stiftung & Co. KG, Fuerth, Fed. Rep. of Germany

[21] Appl. No.: 930,740

[22] Filed: Nov. 13, 1986

[30] Foreign Application Priority Data

Nov. 29, 1985 [DE] Fed. Rep. of Germany ....... 3542242
May 31, 1986 [DE] Fed. Rep. of Germany ....... 3618427

[51] Int. Cl.[4] ............ G11B 5/127

[52] U.S. Cl. ............ 29/603; 360/119; 360/122

[58] Field of Search ............ 29/603; 360/119, 122, 360/125

[56] References Cited

U.S. PATENT DOCUMENTS

| | | | |
|---|---|---|---|
| 3,614,339 | 10/1971 | Schneider | 360/122 |
| 3,839,784 | 10/1974 | Pierce | 29/603 |
| 4,158,213 | 6/1979 | Griffith | 29/603 |
| 4,454,014 | 6/1984 | Bischoff | 360/122 |

FOREIGN PATENT DOCUMENTS

| | | | |
|---|---|---|---|
| 92415 | 6/1985 | Japan | 29/603 |
| 2153581 | 8/1985 | United Kingdom . | |

*Primary Examiner*—P. W. Echols
*Attorney, Agent, or Firm*—Kane, Dalsimer, Sullivan, Kurucz, Levy, Eisele & Richard

[57] ABSTRACT

A method of making of magnetic head having core halves made from ferrite with a sputtered or vaporized soft magnetic alloy of a high permeability such as sendust on the ferrite. The operating magnetic gap of the head is sefined by the soft magnetic alloy of a high permeability. The metal includes providing a longitudinal groove in a ferrite block which serves as the base material and filling this groove with a non-magnetic material such as glass. Thereafter providing vertcial grooves along the block perpendicular to the longitudinal groove. The vertical grooves are vaporized or sputtered with the soft magnetic alloy of high permeability in such a manner that they are completely filled. The block is then halved along the center of the longitudinal groove, ground so as to smooth the adjecent surfaces and provide a coil winding groove and rejoined together via a bonding or adhesive layer. It is then ground to provide the proper head shape with the individual heads then separated from the block.

8 Claims, 10 Drawing Figures

6
S
3
1

6
3
I
II

FIG. 8
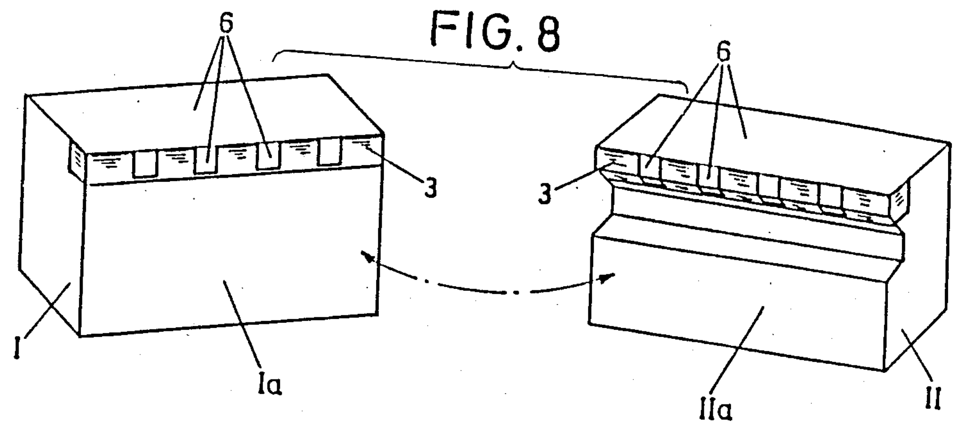
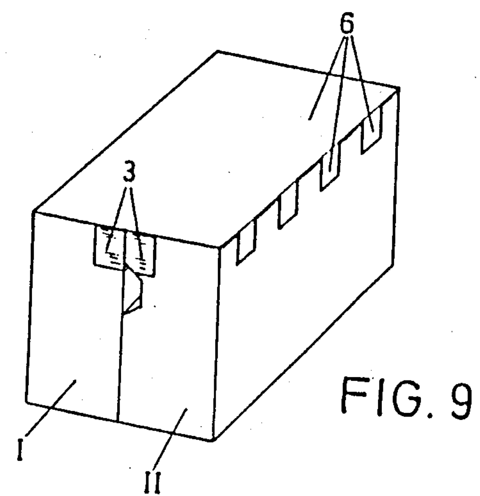
FIG. 9
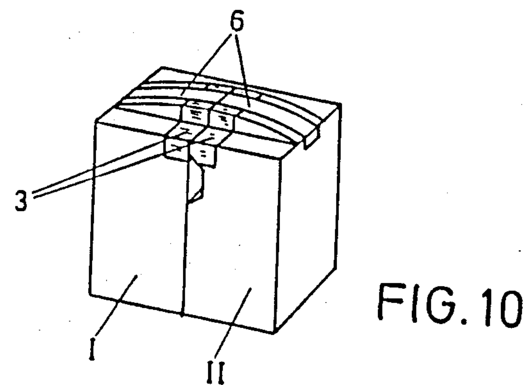
FIG. 10

METHOD FOR MAKING MAGNETIC HEADS

FIELD OF THE INVENTION

The present invention relates to a method for making magnetic heads, in particular, metal-in-gap magnetic heads also known as MIG magnetic heads.

BACKGROUND OF THE INVENTION

MIG (metal-in-gap) magnet heads have been developed and are particularly suitable for recording of video signals on high coercive tapes, such as metal particle tapes (MP-tapes) or vaporized metal tapes (ME-tapes), due to their magnetic characteristics. The basic structure of a head surface of such a magnetic head is by way of illustration shown in FIG. 1. As illustrated, the operational magnetic gap Sp of the head is surrounded on both sides by a soft magnetic layer, preferably made from a sendust alloy S (Fe-Al-Si), a material which has a high permeability or saturation induction. The sendust alloy S is applied to the respective core halves, which are made of ferrite F, by evaporation or sputtering, with the respective core halves having been provided with an adhering layer (not illustrated).

It is known that in such arrangements, pseudo gap effects occur at the border faces between the ferrite F and the sendust alloy S, which cause undesirable maxima and minima in the play back voltage.

In an attempt to avoid such pseudo gap effects tilted-sendust-sputtered-ferrite heads (TSS-heads) were developed wherein the border faces between the ferrite and the sendust alloy extend at an angle of, for example, 45° with respect to the gap. This results in reducing these pseudo gap effects to negligibly small amounts. Such TSS heads are illustrated in German application No. DE-OS 34 47 700.

As disclosed in this reference (see for example FIG. 49), there is provided a magnetic head having an operational magnetic gap g bounded or surrounded on both sides by a soft magnetic layer made of a sendust alloy designated 74 A and B. The border lines or faces between the sendust alloy and the core material made of ferrite 70 and 71 at 70A and 71A extend in a predetermined angle with respect to the gap direction. In addition, non-magnetic glass inserts 72A, and 72B and 73 are provided as a connecting material in the gap area between the two core halves. Since in the known head the sendust layers are exclusively mounted in the gap area and do not extend into the inference or lower area (i.e., not into the area disposed "below" the winding space 75 illustrated in FIG. 49 thereof), an accurate adjusting in the lower area is not required when making the heads. Also, the spatial expansion of the layer to be sputtered thereon is relatively low so that a considerable saving of time is achieved during manufacturing. This is in contrast to the making of magnetic heads wherein the sendust layer extends into the inference or lower area (as for example as set forth in German application No. DE-OS 34 47 700 at FIG. 1, the metal film 2).

With regard to this latter type head, a method for making it is described with respect to FIGS. 42 to 48 of said reference. In this regard, a square shaped ferrite block 40 is provided as a base material for the manufacturing process. A plurality of grooves 42 are ground then into the surface of this ferrite block. These grooves are then filled with molten glass which is designated 43A. Thereafter, the upper side 41 and the front side 44 of ferrite block 40 are ground smooth. A plurality of further grooves 45 are ground into the ferrite block in the next operating step which have a larger width than what is to be the track width. Into these further grooves 45, a thin sendust film is sputtered such that the thickness of the sendust film on the inner sides 46 of grooves 45 will correspond to the desired track width. Thereafter, the grooves 45 are filled with molten glass 49 (see FIG. 46). The upper side 41 and the front side 44 of the block 40 are then ground smooth. A groove 61 (winding space) is provided in the block intended for receiving the winding which thereafter is subsequently mounted. The block made in this manner is designated therein by the number 60.

In the next operating step, the blocks 40 and 60 are placed adjacent to each other and are connected with each other by means of molten glass. The total block which is obtained in this manner is separated along lines A—A and A'—A' for forming individual heads. Finally, the surfaces of the individual heads which are in contact with the magnetic tape are ground and polished.

However, there is a disadvantage to this method. Firstly, the pre- and post-grinding of the ferrite block is expensive. For example, for making n magnetic heads the grinding of 2n "glass"-grooves 42 is required. In addition, care has to be taken that during the sputtering of the sendust alloy on the inside of the grooves 46, the thickness of the sputtered layer corresponds exactly to the track width. This in turn means a high requirement concerning accuracy and requires a constant control or measuring of the thickness of the sputtered on layer. Moreover, the danger exists in this sputtering process that the sputtered sendust layer may peel off from the inner side of groove 46. Accordingly, there exists a need to provide for the manufacture of MIG magnetic heads which avoids the aforenoted disadvantages.

SUMMARY OF THE INVENTION

It is the principal object of the invention to provide a method for making of magnetic heads wherein the prefiling of the block is simplified and the situation wherein the occurrence of a peeling off of the sputtered or vaporized sendust layer is eliminated.

In this regard, the present invention provides for a particular method of making magnetic heads having core halves made from ferrite with a sputtered or vaporized soft magnetic alloy of a high permeability such as sendust on the ferrite. The operating magnetic gap of the head is defined by the soft magnetic alloy of a high permeability. The method includes providing a longitudinal groove in a ferrite block which serves as the base material and filling this groove with a non-magnetic material such as glass. Thereafter, providing transverse grooves along the block perpendicular to the longitudinal groove. The width of the latter grooves correspond approximately to the desired gap length of the magnetic head. The depth of these latter grooves is selected such that it will correspond to the height of the gap.

These grooves are vaporized or sputtered with the soft magnetic alloy of high permeability in such a manner that they are completely filled. This method eliminated the undesired peeling off of the sputtered layer from the ferrite core support. The block is then halved along the center of the longitudinal groove, ground so as to smooth the adjacent surfaces and to provide a coil groove and rejoined together via a bonding or adhesive layer. This rejoined block is then ground to provide the proper head shape with the individual heads then separated from the block. Thus, the method provides a relatively simple and effective way of manufacturing such magnetic heads.

BRIEF DESCRIPTION OF THE DRAWINGS

Thus, by the present invention, its objects, and advantages will be realized, the description of which should be taken in conjunction with the drawings, wherein:

FIGS. 8–9 illustrate separating the block into halves, providing a coil winding groove on one of the halves and rejoining the halves; and FIG. 10 illustrates the individual head so formed by the method of the present invention.

DETAILED DESCRIPTION OF THE PREFERRED EMBODIMENT

Figure 1:
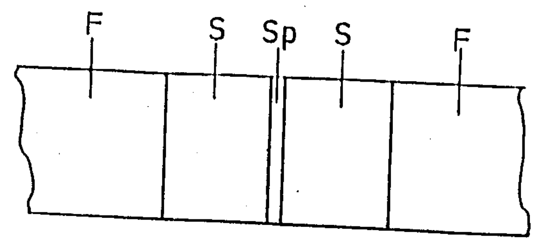
FIG. 1 illustrates the basic head surface structure of an MIG magnetic head.
Figure 2:
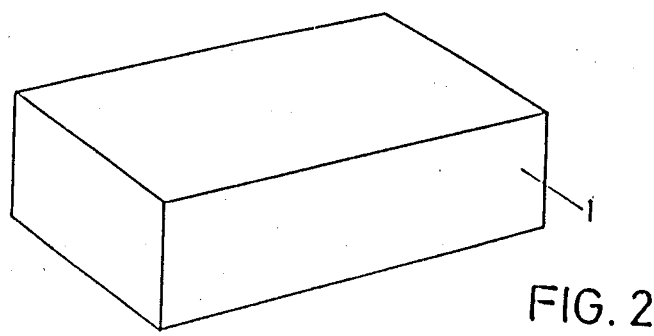
FIG. 2 illustrates a rectangular shape ferrite block providing the base material.
Figure 3:
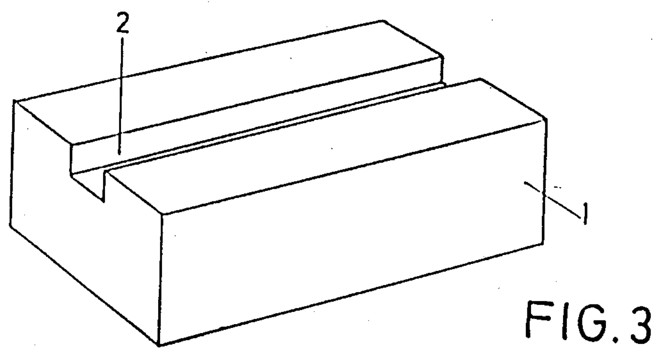
FIGS. 3 and 4 illustrate forming a longitudinal gap in the ferrite block and filling it with a non-magnetic material.
Figure 4:
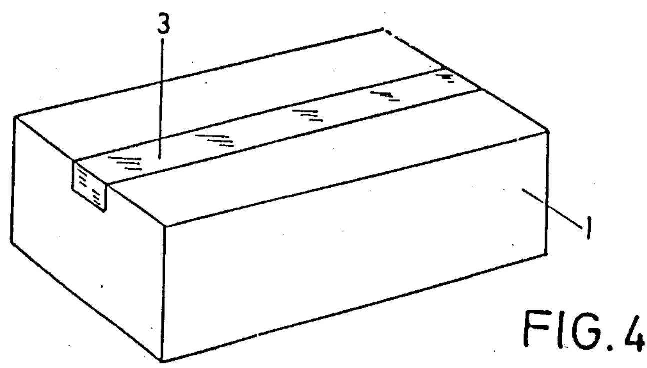

Turning now more particularly to the drawings, base material is provided in the form of a square shaped ferrite block 1, as shown in FIG. 2. A groove 2 is ground into this ferrite block 1 as can be seen from FIG. 3. This groove 2 extends parallel to the operating gap to be formed in the magnetic heads formed from the ferrite block. Groove 2 is filled with a non-magnetic material, preferably such as molten glass, as is indicated in FIG. 4.

Additional grooves 4 are then made. In this regard, the making of these further grooves may be performed by grinding, wet etching or plasma etching (sputtering etching). A wet etching or plasma etching is available because the grooves 4 are tight and flat as compared to the glass groove 2. Note that etching is advantageous with respect to grinding in that the structure or the crystalline structure of the ferrite is not affected and that the later formed magnetic head is provided with improved magnetic characteristics.

Figure 5:
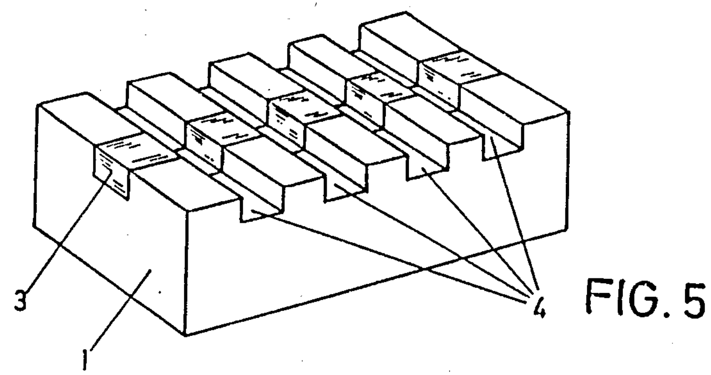
FIGS. 5–7 illustrate forming a plurality of perpendicular grooves in the ferrite block, and coating the surface with an adhering surface and then a highly permeable magnetic material.
Figure 6:
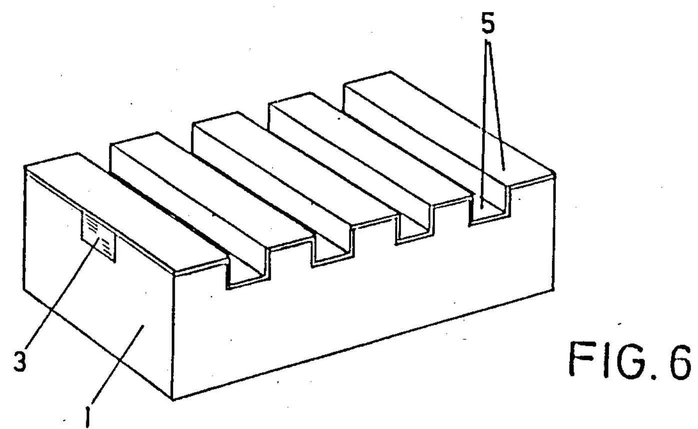

The depth of the grooves 4 is selected such that they are adjusted to the desired gap height of the magnetic head or such that the inference or lower area of the magnetic head is not affected. The widths of grooves 4 are only slightly thicker than the desired track width or gap length (i.e., by the thickness of the adhering layer). In this regard, in FIG. 5 there is shown a block 1 having grooves 4 etched therein. The upper surface of the block 1 is then vaporized or sputtered with a thin adhering layer 5 as shown in FIG. 6.

Thereafter the adhering layer 5 is vaporized or sputtered with the sendust alloy 6 in such a manner that grooves 4 are completely filled with the sendust alloy 6. In such a process the track width or gap length has already been determined by the grinding or etching process. A constant control or a continuous measuring of the thickness of the sputtered or vaporized sendust layer during the sputtering process is not required. In addition, this process effectively prevents a peeling off of the sendust layer from the support material. During the vaporization, rather, care has to be taken to make sure that the further grooves 4 are completely filled with sendust alloy as shown in FIG. 7.

Figure 7:
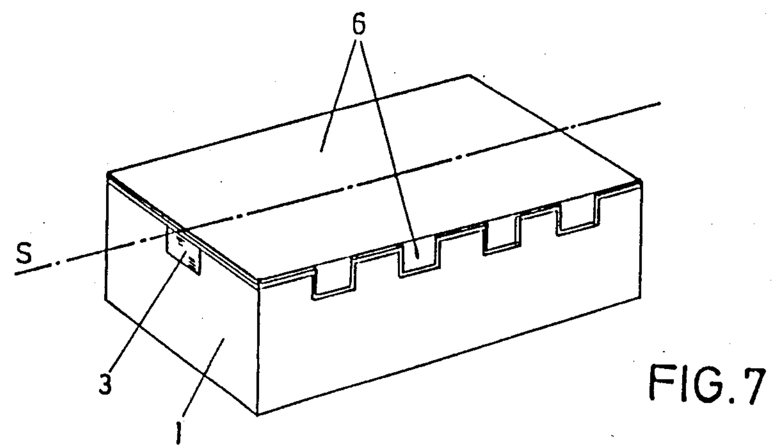

The block 1 is thereafter separated longitudinally into block halves I and II along the dotted line S shown in FIG. 7. Block half II is provided with a winding groove or space for the coil winding, as shown in FIG. 8. Subsequently, the gap planes I*a* and II*a* of the two block halves I and II are smoothed, vaporized or sputtered with non-magnetic gap material (for example, aluminum oxide or silicon oxide) and the two block halves are joined together as shown in FIG. 9 by way of glass solder (not illustrated) or connected with an adhesive or other means suitable for purpose. The resulting block is then ground down to the height of the gap and the individual heads are separated. Finally, the obtained individual head can be seen in FIG. 10.

Note that the formation of groove 2, the winding space for the coil and the grinding of the finished block to the height of the gap is preferably performed by means of grinding due to the comparatively large amount of ferrite which has to be removed. Alternate means to provide such results, aside from grinding, if suitable for purpose, may also be utilized.

Thus, by the foregoing invention, the aforesaid objects, advantages, and others are realized, and while a preferred embodiment has been disclosed and described in detail herein, its scope should not be limited thereby, rather, its scope should be determined by that of the appended claims.

What is claimed is:

1. A method of making a magnetic head having core halves made of a magnetic material such as ferrite, with a magnetic material of a high permeability being affixed thereto in an operational magnetic gap area, comprising the following steps:

providing a block of magnetic material such as ferrite;

providing a first groove in said block in a first direction;

filling said first groove with a non-magnetic material such as glass;

providing a plurality of second grooves in said block in a second direction perpendicular to the direction of the first groove, with the depth of the second groove being predetermined so as to correspond to the desired gap height and the width of said second grooves corresponds to a desired track width;

providing an adhering layer on said block including on said second grooves;

providing highly permeable magnetic material layer on said adhering layer which includes the filling of said second grooves therewith;

dividing said block along said first groove into block halves;

providing in at least one of said halves a winding space adapted to receive a coil winding;

providing a non-magnetic material on said respective block halves;

reconnecting said respective block halves along respective faces and orienting each as such so as to substantially align respective portions of the second grooves with said non-magnetic material being between the reconnected block halves;

working the block to form the desired head surface configuration; and separating the block into respective magnetic heads.

2. The method in accordance with claim 1 wherein said adhering layer, highly permeable magnetic layer and nonmagnetic material are provided by sputtering or vaporizing.

3. The method in accordance with claim 2 wherein said first and second grooves and said winding space are providing by grinding.

4. The method in accordance with claim 3 wherein said working of the block includes grinding the block to the height of the desired operational gap.

5. The method in accordance with claim 1 wherein said second grooves are provided by etching.

6. The method in accordance with claim 5 wherein said etching is performed by wet etching.

7. The method in accordance with claim 5 wherein said etching is performed by plasma etching.

8. The method in accordance with claim 1 wherein said second grooves are provided by grinding.

* * * * *

UNITED STATES PATENT AND TRADEMARK OFFICE
CERTIFICATE OF CORRECTION

PATENT NO. : 4,704,788

DATED : November 10, 1987

INVENTOR(S) : ECKSTEIN

It is certified that error appears in the above-identified patent and that said Letters Patent is hereby corrected as shown below:

IN THE ABSTRACT:

Line 1, change "head" to --heads--;

Line 5, change "sefined" to --defined--;

Line 6, change "metal" to --method--;

Line 15, change "adjecent" to --adjacent--.

IN THE SPECIFICATION:

Column 1, Line 45, delete "and" (first occurrence);

Column 4, Line 45, change "groove" to --grooves--.

Signed and Sealed this

Twenty-fourth Day of May, 1988

*Attest:*

DONALD J. QUIGG

*Attesting Officer* *Commissioner of Patents and Trademarks*